United States Patent
Kanamarlapudi et al.

(10) Patent No.: US 8,977,279 B2
(45) Date of Patent: Mar. 10, 2015

(54) APPARATUS AND METHOD OF PRIORITIZING RRC SIGNALING MESSAGES

(71) Applicant: QUALCOMM Incorporated, San Diego, CA (US)

(72) Inventors: Sitaramanjaneyulu Kanamarlapudi, San Diego, CA (US); Atin Kumar, San Diego, CA (US); Ahsan Iftikhar, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 13/745,187

(22) Filed: Jan. 18, 2013

(65) Prior Publication Data
US 2013/0324142 A1 Dec. 5, 2013

Related U.S. Application Data

(60) Provisional application No. 61/653,170, filed on May 30, 2012.

(51) Int. Cl.
*H04W 72/10* (2009.01)
*H04W 72/12* (2009.01)
*H04W 72/04* (2009.01)

(52) U.S. Cl.
CPC .......... *H04W 72/10* (2013.01); *H04W 72/0406* (2013.01); *H04W 72/1242* (2013.01)
USPC ........................................ 455/452.1; 370/328

(58) Field of Classification Search
CPC ....... H04W 72/10; H04W 4/12; H04W 24/00; H04W 72/0406; H04W 72/1242
USPC ......... 455/404.1, 452.1, 550.1; 370/328, 329, 370/377, 474
See application file for complete search history.

(56) References Cited

U.S. PATENT DOCUMENTS

| 8,274,939 | B2 | 9/2012 | Park et al. |
| 2008/0225785 | A1 | 9/2008 | Wang et al. |
| 2008/0227442 | A1 | 9/2008 | Pani et al. |
| 2009/0201864 | A1* | 8/2009 | Ahluwalia ..................... 370/329 |
| 2010/0182952 | A1 | 7/2010 | Jeong et al. |

FOREIGN PATENT DOCUMENTS

| EP | 1608194 A1 | 12/2005 |
| WO | 2007091715 A1 | 8/2007 |
| WO | 2008098738 A1 | 8/2008 |

OTHER PUBLICATIONS

International Search Report and Written Opinion—PCT/US2013/043014—ISA/EPO—Aug. 21, 2013.

* cited by examiner

*Primary Examiner* — Sam Bhattacharya
(74) *Attorney, Agent, or Firm* — Charles Chesney

(57) ABSTRACT

Apparatus and methods of communicating in a communication network include the actions of and components for receiving one or more radio resource control (RRC) messages in a radio link control (RLC) queue, determining a RRC message type of the one or more RRC messages located in the RLC queue, prioritizing the one or more RRC messages located in the RLC queue according to the corresponding RRC message type, and transmitting the prioritized one or more RRC messages in order of priority.

32 Claims, 11 Drawing Sheets

APPARATUS AND METHOD OF PRIORITIZING RRC SIGNALING MESSAGES

CLAIM OF PRIORITY UNDER 35 U.S.C. §119

The present Application for Patent claims priority to Provisional Application No. 61/653,170 entitled "APPARATUS AND METHOD OF PRIORITIZING RRC SIGNALING MESSAGES" filed May 30, 2012, and assigned to the assignee hereof and hereby expressly incorporated by reference herein.

BACKGROUND

1. Field

Aspects of the present disclosure relate generally to wireless communication systems, and more particularly, to an apparatus and method of prioritizing received radio resource control (RRC) signaling messages.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. One such desired enhancement of the user experience, is to reduce network (NW) side timeouts, which may be caused when the user equipment (UE) is not able to meet the RRC requirements to complete the signaling procedure successfully. Such errors occur due the delayed transmission of the RRC signaling messages, resulting in a declaration that the ongoing RRC signaling procedure has failed because the time frame set by the 3GPP RRC standards, e.g., 3GPP Technical Specification 25.331, Section 13.5, have not been met.

Therefore, improvements are desired for transmission of RRC signaling messages exchanged between the NW and the UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of communicating in a communication network includes receiving one or more radio resource control (RRC) messages in a radio link control (RLC) queue, determining a RRC message type of the one or more RRC messages located in the RLC queue, prioritizing the one or more RRC messages located in the RLC queue according to the corresponding RRC message type, and transmitting the prioritized one or more of RRC messages in order of priority.

In another aspect, a computer program product for communicating in a communication network comprises a computer-readable medium including a plurality of instructions. The instructions include at least one instruction operable to cause a computer to receive one or more radio resource control (RRC) messages in a radio link control (RLC) queue, and at least one instruction operable to cause the computer to determine a RRC message type of the one or more RRC messages located in the RLC queue. Additionally, the instructions include at least one instruction operable to cause the computer to prioritize the one or more RRC messages located in the RLC queue according to the corresponding RRC message type, and at least one instruction operable to cause the computer to transmit the prioritized one or more of RRC messages in order of priority.

In a further aspect, an apparatus for wireless communication includes means for receiving one or more radio resource control (RRC) messages in a radio link control (RLC) queue, and means for determining a RRC message type of the one or more RRC messages located in the RLC queue. Additionally, the apparatus includes means for prioritizing the one or more RRC messages located in the RLC queue according to the corresponding RRC message type, and means for transmitting the prioritized one or more of RRC messages in order of priority.

Moreover, in an additional aspect, an apparatus for communicating in a communication network includes a communications component comprising a receiver configured to receive one or more radio resource control (RRC) messages in a radio link control (RLC) queue. Further, the apparatus includes a message type detector component configured to determine a RRC message type of the one or more RRC messages located in the RLC queue. Also, the apparatus includes a prioritization module, comprising a processor, configured to prioritize the one or more RRC messages located in the RLC queue according to the corresponding RRC message type. Additionally, the communications component further comprises a transmitter configured to transmit the prioritized one or more of RRC messages in order of priority.

These and other aspects of the disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As indicated above, a desired enhancement of the user experience is to reduce network (NW) side timeouts, which may be caused when the UE is not able to meet the radio resource control (RRC) requirements to complete the signaling procedure successfully. Such errors occur due the delayed transmission of the RRC signaling messages, resulting in a declaration that the ongoing RRC signaling procedure has failed because the time frame set by the 3GPP RRC standards have not been met. In other words there is a possibility that the NW might declare the ongoing RRC signaling procedure as a failure as a UE does not meet the time frame required by 3GPP RRC standards and network configurations. It should be noted, in addition, that expedited transmissions may also be desired by a network entity transmitting to a UE.

Thus, aspects of the present apparatuses and methods teach a mechanism, which may be utilized by a UE or a network entity such as a Node B, for prioritizing ongoing RRC signaling to ensure timely delivery of an RRC signaling message. As such, the present apparatuses and methods may enhance the reliability of an RRC signaling procedure and the call success and/or sustainability rates.

Figure 1:
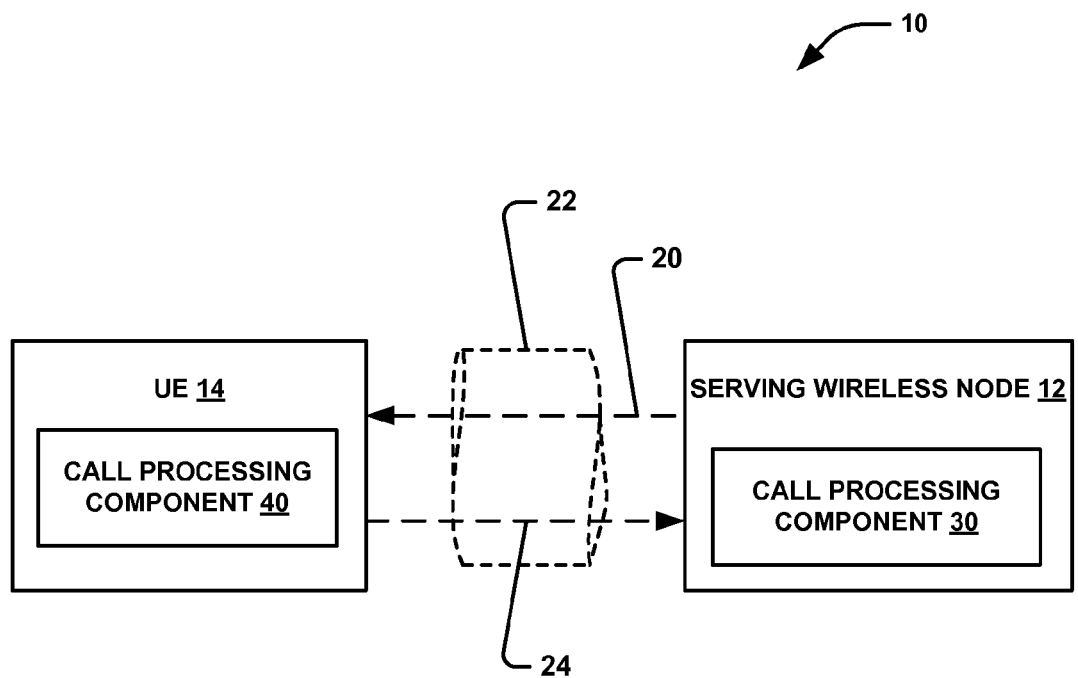
FIG. 1 is a schematic diagram illustrating an example wireless system including aspects of the present disclosure.

Referring to FIG. 1, in one aspect, a wireless communication system 10 is configured to facilitate prioritizing of RRC signaling messages. System 10 includes at least one user equipment (UE) 14 that may communicate wirelessly with one or more wireless network nodes, including, but not limited to, serving wireless node 12, via one or more channels 22.

The one or more channels 22 may include, but are not limited to, signaling radio bearers and/or data radio bearers. Serving wireless node 12 may be configured to transmit one or more signals 20 to UE 14 over the one or more channels 22, and/or UE 14 may transmit one or more signals 24 to serving wireless node 12. In an aspect, signal 20 and signal 24 may include, but are not limited to, one or more messages, such as a signaling-related message and a measurement-related message. In a further, more specific, aspect, the one or more channels 22 may include one or more radio link control (RLC) radio bearers, and the one or more signals 20 and the one or more signals 24 each may include one or more signaling radio bearer (SRB) messages and/or one or more RRC messages, such as RRC signaling messages which can be RRC measurement messages, an active set update (ASU) message, an active set update complete message, and any other RRC message exchanged according to 3GPP Technical Specification 25.331, section 13.5, "UE RRC Procedure Performance."

In an aspect, UE 14 may include a call processing component 40, which may be configured to prioritize transmission of RRC messages 20 to serving wireless node 14, for example, based on an attribute of the RRC messages, such as a message type. Similarly, in an optional or additional aspect, the serving wireless node 12 may include a call processing component 30, which may be configured to prioritize transmission of RRC messages 20 to UE 14, for example, based on an attribute of the RRC messages, such as a message type. Specifically, in an aspect, call processing component 40 of UE 14, and/or call processing component 30 of serving wireless node 14, may prioritize RRC signaling-related messages over RRC measurement-related messages in order to ensure that radio bearer establishment and/or maintenance procedures are executed in a timely fashion. As such, the operation of call processing component 40 of UE 14, and/or call processing component 30 of serving wireless node 12, may avoid time outs or other failures that may occur in RRC procedures that may be caused by delays in sending RRC signaling-related messages. Accordingly, the present call processing component 40 of UE 14, and/or call processing component 30 of serving wireless node 12, may operate to avoid radio link failures, and the tearing down of radio bearers, during RRC procedures.

UE 14 may comprise a mobile apparatus and may be referred to as such throughout the present disclosure. Such a mobile apparatus or UE 14 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, serving wireless node 12 of system 10, may include one or more of any type of network component, such as an access point, including a base station (BS) or node B, a relay, a peer-to-peer device, an authentication, authorization and accounting (AAA) server, a mobile switching center (MSC), a radio network controller (RNC), etc. In a further aspect, the one or more wireless nodes 12 of system 10 may include one or more small base stations, such as, but not limited to a femtocell, picocell, microcell, or any other small base station. Furthermore, serving wireless node 12 may include a channel altering component 114, which may be configured to receive a RRC signaling messages (e.g. via message 112), and process the RRC signaling messages associated with serving channel 108, UE 14, all UEs 14 served by serving wireless node 12, or a portion thereof.

Figure 2:
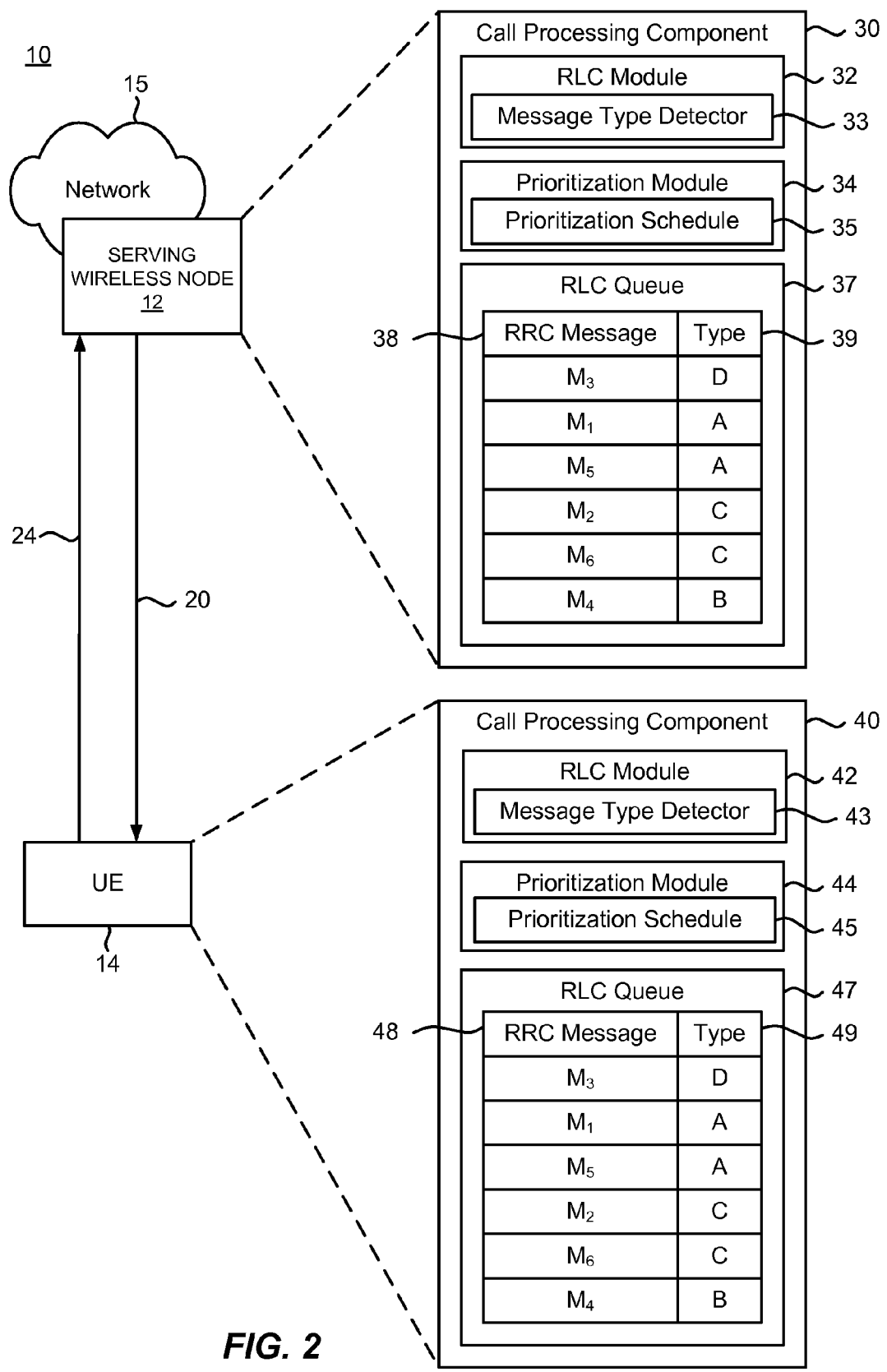
FIG. 2 is a schematic diagram illustrating an expanded example of the wireless communication system of FIG. 1, including an aspect of a call processing component having a prioritization module.

Referring to FIG. 2, a more detailed view of call processing component 40 and call processing component 30 is provided, and wireless communication system 10 may include serving wireless node 12 as an access point to a wireless communication network 15, such as but not limited to the Internet. In an aspect, within serving wireless node 12, which may include but is not limited to an eNodeB, base station, access point, etc., resides call processing component 30. For example, but not limited hereto, call processing component 30 may be hardware mounted within serving wireless node 12, software or computer-readable media and/or firmware stored within a memory or processor of serving wireless node 12, or any combination thereof. The call processing component 30 is configured to include a radio link control (RLC) module 32 for, among other things, managing the transmission of the RRC messages 38 in the RLC queue 37. For example, RLC queue 37 may include but is not limited to a buffer or memory location wherein RRC messages 38 for transmission may be stored. Further, for example, RLC module 32 may include a message type detector 33 configured to identify data within each RRC message 38, recognize a certain data value or data within a certain position as being indicative of a message type, and associate the detected message type with the message. Additionally, the call processing component 30 is also configured to include a prioritization module 34 for prioritizing the RRC messages in the RLC queue 37. For example, in an aspect, prioritization module 34 may include a prioritization schedule 35, such as but not limited to an algorithm, a function, a list, etc., which defines a relative order in which different RRC message types should be prioritized for transmission. As such, in an aspect, the prioritization order in which the RRC messages 38 are sent is determined according to prioritization schedule 35, which prioritizes the RRC messages 38 according to message type 39. For example, in one aspect, prioritization schedule 35 may prioritize certain message types over other message types to improve an ability to achieve a time frame set by a relevant standard, such as the 3GPP RRC messaging standard, including but not limited to 3GPP Technical Specification 25.331, section 13.5, "UE RRC Procedure Performance."

For instance, to ensure that certain types of signaling messages are prioritized over the other types of signaling messages, the RLC module 32 analyzes the RRC messages 38 in the RLC queue 37. For example, in an aspect, RLC module 32 executes message type detector 33 to identify the respective message type 39 of each RRC message 38 in the RLC queue 37. As such, when the RLC module 32 looks through the RRC messages 38 in the RLC queue 37, an associated message type 39 may be detected and used by prioritization module 34 to at least partially order or to reorder RRC messages 38.

Similarly, in an alternative or additional aspect, the above-noted functionality of the RLC module 32 may be included in the UE 14 instead of, or in addition to, such functionality being included in a network entity such as serving wireless node 12. For example, but not limited hereto, call processing component 30 may be hardware mounted within UE 14, software or computer-readable media and/or firmware stored within a memory or processor of UE 14, or any combination thereof. Further, for example, in an aspect, the UE 14 may include call processing component 40 that is configured to include a RLC module 42 for managing the RRC messages 48 in the RLC queue 47. For example, RLC queue 47 may include but is not limited to a buffer or memory location wherein RRC messages 48 for transmission may be stored. Further, for example, RLC module 42 may include a message type detector 43 configured to identify data within each RRC message 48, recognize a certain data value or data within a certain position as being indicative of a message type, and associate the detected message type with the message. RLC module 40 is also configured to include a prioritization module 44 for prioritizing the RRC messages 48 in the RLC queue 47. For example, in an aspect, prioritization module 44 may include a prioritization schedule 45, such as but not limited to an algorithm, a function, a list, etc., which defines a relative order in which different RRC message types should be prioritized for transmission. As such, in an aspect, the prioritization order in which the RRC messages 48 are at least partially ordered, reordered, and eventually transmitted is determined according to prioritization schedule 45, which prioritizes the RRC messages 48 according to message type 49. For example, in one aspect, prioritization schedule 45 may prioritize certain message types over other message types to improve an ability to achieve a time frame set by a relevant standard, such as the 3GPP RRC standard, including but not limited to 3GPP Technical Specification 25.331, section 13.5, "UE RRC Procedure Performance."

For instance, to ensure that certain types of signaling messages are prioritized over the other types of signaling messages, the RLC module 42 looks through the RRC messages 48 in the RLC queue 47. For example, in an aspect, RLC module 32 executes message type detector 33 to identify the respective message type 39 of each RRC message 38 in the RLC queue 37. As such, when the RLC module 42 looks through the RRC messages 38 in the RLC queue 47, the associated message type 49 may be detected and used to at least partially order or to reorder RRC messages 48 via the prioritization module 44.

It should be noted that, as described in FIGS. 1 and 2, the components/modules/means may be hardware components specifically configured to carry out the stated processes/algorithm, or may be implemented by a processor configured to perform the stated processes/algorithm, or may be stored within a computer-readable medium for implementation by a processor, or some combination thereof, as will be discussed in more detail below.

Thus, the present apparatus and methods include a UE-based, and/or a network entity-based, call processing component having an RLC module configured to prioritize certain types of signaling messages over the other types of signaling messages, for example, in order to avoid delay in transmitting such messages. Thus, the present apparatus and methods improve an ability of the UE and/or the network entity to achieve a time frame set by a relevant standard, such as the 3GPP RRC standard, for transmission and/or receipt of the respective message.

Figure 3:
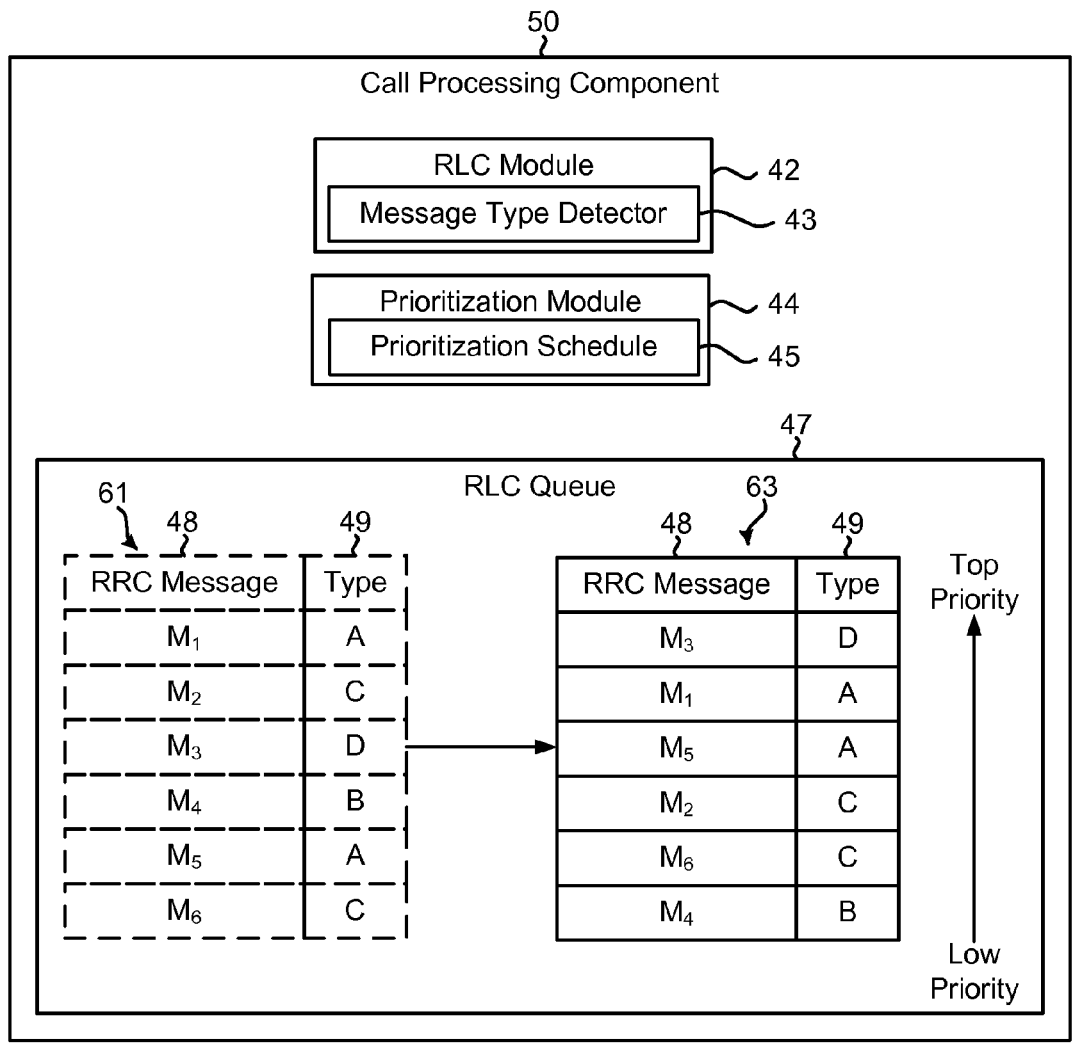
FIG. 3 is a schematic diagram illustrating an aspect of a call processing component performing an exemplary reordering of the RRC messages.

FIG. 3 illustrates the exemplary ordering or reordering of the RRC messages within call processing component 40 resulting in a prioritized ordering of RRC messages for transmission. Although FIG. 3 illustrates call processing component 40 of UE 14, it should be noted that similar reordering may occur in a similar way in call processing component 30 of serving wireless node 12.

After one or more of the RRC messages 48 arrive in the RLC queue 47, RLC module 42 and prioritization module 44 operate to reorder the RRC messages 48 based on the respective message type 49 of each RRC message 48. Specifically, in this example, RRC messages $M_1$-$M_6$ are received in first-in-first-out (FIFO) order at the RLC queue 47, e.g., with message $M_1$ being received before message $M_2$, and so on, as depicted in a first RRC message order 61. The respective RRC message type 49 associated with RRC messages $M_1$-$M_6$ is also identified by RLC module 42 and associated with respect to each RRC message 48 in the RLC queue 47. For example, RLC module 42 may execute message type detector 43 to detect and identify the respective message type 49.

For example, in FIG. 3, RRC message $M_1$ corresponds to RRC message type A. RRC message $M_2$ corresponds to RRC message type C. RRC message $M_3$ corresponds to RRC message type D. RRC message $M_4$ corresponds to RRC message type B. RRC message $M_5$ corresponds to RRC message type A. RRC message $M_6$ corresponds to RRC message type B. As used herein, message types A, B, C, and D represent different types of RRC messages.

After receiving the RRC messages $M_1$-$M_6$ and identifying their corresponding message types, the prioritization module 44 operates to prioritize the RRC messages 48 in RLC queue 47. For example, prioritization module 44 may reorder the RRC messages $M_1$-$M_6$ according to the prioritization schedule 45. In this case, in one example that should not be construed as limiting, prioritization schedule 45 may be: RRC message type D>RRC message type A>RRC message type C>RRC message type B.

Specifically, the RRC messages 48 have been reordered in the RLC Queue 47, where the original FIFO order of first RRC message order 61 has been replaced with a prioritized order 63, e.g. a second RRC message order, based on prioritization schedule 45. It should be noted that the RRC messages 58 in prioritized order 63 are illustrated in descending order of priority, where the higher priority messages are on top and the lower priority messages are at the bottom.

Thus, call processing component 50, executing RLC module 42 and prioritization module 44, transforms the original order of RRC messages in the RLC queue, e.g., the original FIFO order of first RRC message order 61, into a new and different order, e.g., prioritized order 63. As such, call processing component 50 executing RLC module 42 and prioritization module 44 may selectively prioritize one or more RRC message types over one or more other RRC message types. In an aspect, prioritized order 63 may include ordering a first RRC message type before a second RRC message type and a third RRC message type, and ordering the second RRC message type before the third RRC message type. Further, in some cases, some RRC message types may not be prioritized, and may remain in a relative FIFO order. For instance, in the above example, when the one or more RRC messages are received in a first-in-first-out (FIFO) order, any of the one or more RRC messages of the third RRC message type may remain in the FIFO order, relative to one another, after the prioritizing. Additionally, in an aspect to achieve a time frame set by a relevant standard, for example, signaling types of RRC messages are prioritized over other types of RRC messages. For example, the other types of RRC messages include at least a measurement message.

Figure 4:
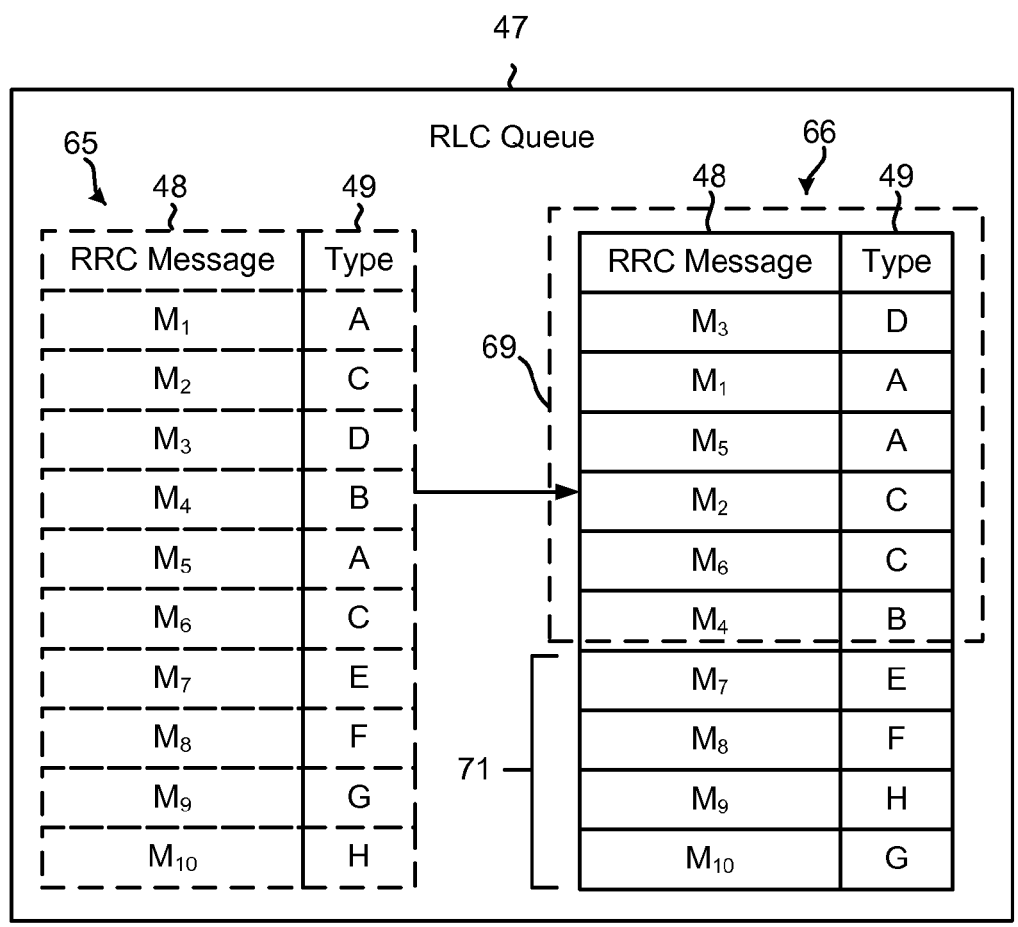
FIG. 4 is a schematic diagram illustrating an aspect of an RLC queue having another example of reordering RRC messages.

FIG. 4 is another example of reordering the RRC messages 48 in the RLC queue 47 when a first set of RRC messages 65, e.g., in an original FIFO order, includes at least one RRC message 48 having a message type 49 that is not included in prioritization schedule 45, e.g., not of type A-D in the examples used above. Much like the reordering of RRC messages 48 depicted in FIG. 3, in this case, RRC messages $M_1$-$M_6$ are reordered based upon RRC message type 49 and prioritization schedule 45. In other words, similar to reordering disclosed in FIG. 3, RRC messages of type A-D are reordered such that the D type RRC message are given a higher priority than A type RRC messages, which in turn are given a higher priority than C type RRC messages, which in turn are given a higher priority of B type RRC messages.

However, in this case, RRC message types E-G are not reordered based on message type 49, but stay in the FIFO order in the RLC queue 47. In other words, RRC message types E-G are not reordered since the prioritization schedule 45 is silent with regard to these message types. As such, after reordering, prioritized order 66 of RRC messages 48 in RLC queue 47 includes a prioritized portion 69 ordered based on prioritization schedule 45, and a non-prioritized or FIFO portion 71 ordered in the original or FIFO order and relatively prioritized after the RRC messages of prioritized portion 69.

It should be noted that in the exemplary FIGS. 2-4, only certain RRC message types, e.g. types A-D, are listed in the prioritization schedule 45, but other RRC message types, e.g. types E-G, may also be included in the prioritization schedule 55. In other words, prioritization schedule 45 may include all know RRC message types 49, or only a portion of the RRC message types 49.

Figure 5:
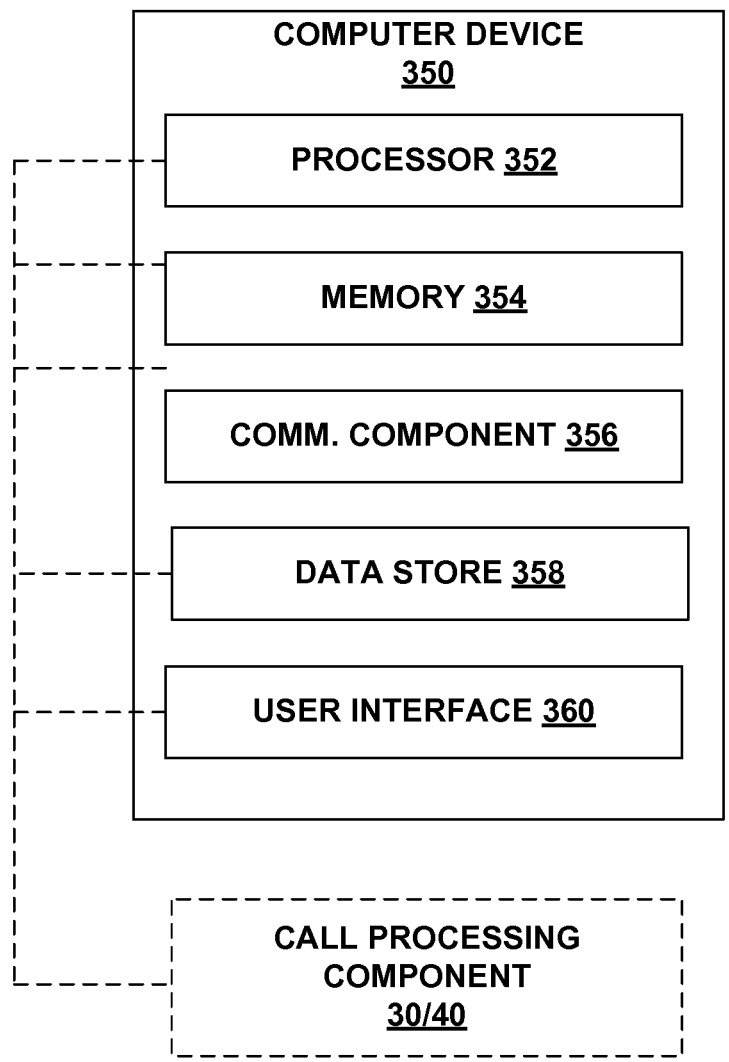
FIG. 5 is a block diagram illustrating additional example components of an aspect of a computer device having a call processing component according to the present disclosure.

Referring to FIG. 5, in one aspect, UE 14 and/or serving wireless node 12 of FIGS. 1 and/or 2 may be represented by a specially programmed or configured computer device 350, wherein the special programming or configuration includes call processing component 40 and/or call processing component 30 as described herein. For example, for implementation as UE 14 (FIGS. 1 and 2), computer device 350 may include one or more components for computing and transmitting a RRC signaling message, such as in specially programmed computer readable instructions or code, hardware, firmware, or some combination thereof. Computer device 350 includes a processor 352 for carrying out processing functions associated with one or more of components and functions described herein. Processor 352 can include a single or multiple set of processors or multi-core processors. Moreover, processor 352 can be implemented as an integrated processing system and/or a distributed processing system.

Computer device 350 further includes a memory 354, such as for storing data used herein and/or local versions of applications being executed by processor 352. Memory 354 can include any type of memory usable by a computer, such as random access memory (RAM), read only memory (ROM), tapes, magnetic discs, optical discs, volatile memory, non-volatile memory, and any combination thereof.

Further, computer device 350 includes a communications component 356 that provides for establishing and maintaining communications with one or more parties utilizing hardware, software, and services as described herein. Communications component 356 may carry communications between components on computer device 350, as well as between computer device 350 and external devices, such as devices located across a communications network and/or devices serially or locally connected to computer device 350. For example, communications component 356 may include one or more buses, and may further include transmit chain components and receive chain components associated with a transmitter and receiver, respectively, or a transceiver, operable for interfacing with external devices. For example, in an aspect, a receiver of communications component 356 operates to receive one or more radio resource control (RRC) messages into a radio link control (RLC) queue, which may be a part of memory 354. Also, for example, in an aspect, a transmitter of communications component 356 operates to transmit, e.g. from the RLC queue, the prioritized one or more RRC messages in order of priority.

Additionally, computer device 350 may further include a data store 358, which can be any suitable combination of hardware and/or software, that provides for mass storage of information, databases, and programs employed in connection with aspects described herein. For example, data store 358 may be a data repository for applications not currently being executed by processor 352.

Computer device 350 may additionally include a user interface component 360 operable to receive inputs from a user of computer device 350, and further operable to generate outputs for presentation to the user. User interface component 360 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 360 may include one or more output devices, including but not limited to a display, a speaker, a haptic feedback mechanism, a printer, any other mechanism capable of presenting an output to a user, or any combination thereof.

Furthermore, computer device 350 may include, or may be in communication with, call processing component 40 and/or call processing component 30, which may be configured to perform the functions described herein.

Figure 6:
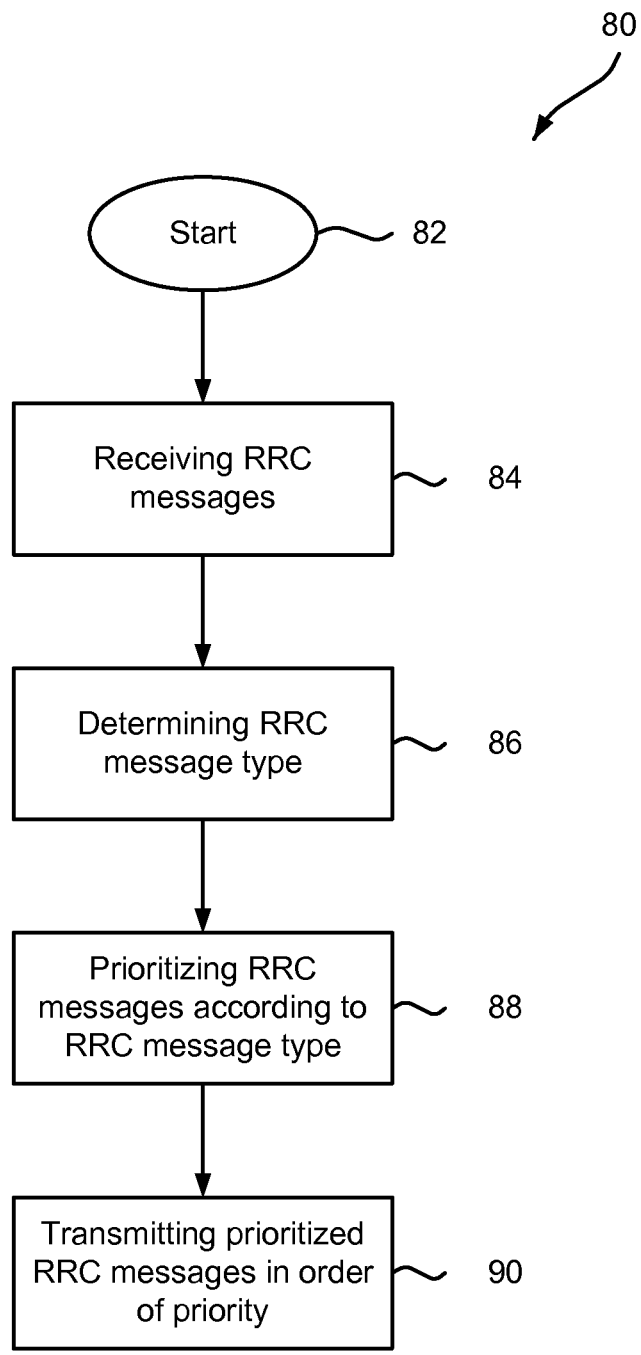
FIG. 6 is a flow diagram illustrating one example of an aspect of a method of reordering of RRC messages for transmission in a wireless communication system.

FIG. 6 is a flow diagram illustrates an exemplary method 80 of reordering of the RRC messages in a wireless communication system. At 82, the reordering of the RRC messages in the wireless communication system begins. At 84, the RRC messages are received in the RLC queue. For example, RRC messages 38 may be received within the RLC queue 37/47 residing in call processing module 30/40 (FIG. 2).

Determining a message type of the one or more RRC messages located in the RLC queue via a RLC function occurs at 86. For example, the determining of the RRC message type 39/49 located within RLC queue 37/47 may occur in accordance with the RLC module 32/42, e.g., executing message type detector 33/43 (FIG. 2).

Prioritizing the one or more RRC messages located in the RLC queue according to the corresponding RRC message type occurs at 88. For example, a prioritization module 34/44 prioritizes the RRC message 38/48 by RRC message type 39/49 according to prioritization schedule 35/45 (FIG. 2).

Finally, at 90, the prioritized RRC messages are transmitted over the wireless communication system in order of priority. For example, call processing component 30/40 may be configured to transmit the prioritized RRC messages 38/48 from serving wireless node 12 to the UE 14, or from UE 14 to serving wireless node 12 (FIG. 2).

Figure 7:
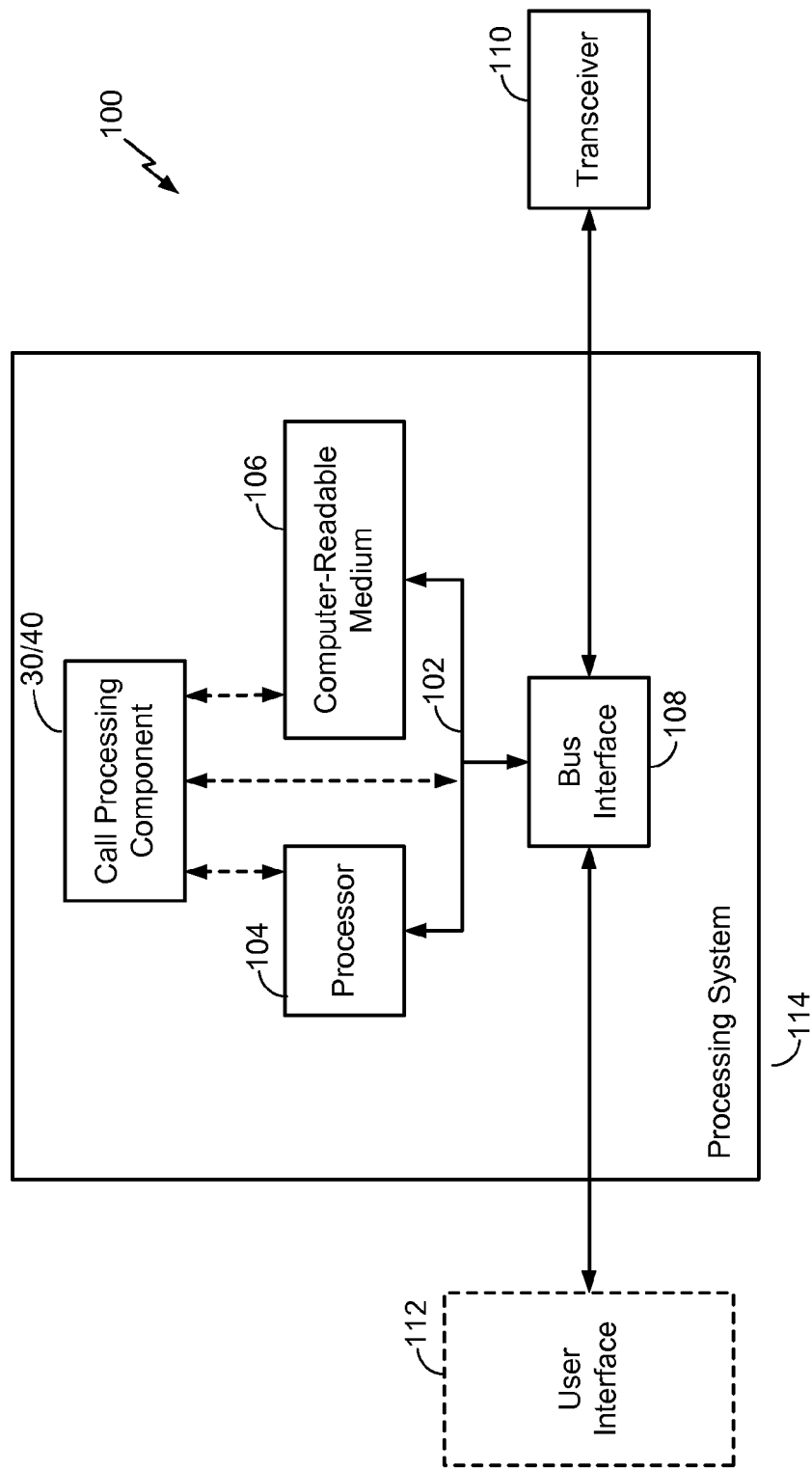
FIG. 7 is a block diagram illustrating an example of a hardware implementation for an apparatus employing a processing system to perform the functions described herein.

FIG. 7 is a block diagram illustrating an example of a hardware implementation for an apparatus 100 employing a processing system 114 for carrying out prioritization of RRC messages, such as by implementing call processing component 30/40 (FIGS. 1 and 2). In this example, the processing system 114 may be implemented with a bus architecture, represented generally by a bus 102. The bus 102 may include any number of interconnecting buses and bridges depending on the specific application of the processing system 114 and the overall design constraints. The bus 102 links together various circuits including one or more processors, represented generally by the processor 104, computer-readable media, represented generally by the volatile or/or non-volatile computer-readable storage medium 106, and one or more components described herein, such as, but not limited to, the call processing component 30/40 (FIGS. 1 and 2). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium.

Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable storage medium 106. The software, when executed by the processor 104, causes the processing system 114 to perform the various functions described infra for any particular apparatus. The computer-readable storage medium 106 may also be used for storing data that is manipulated by the processor 104 when executing software.

Thus, call processing component 30/40 may be a separate physical component, or a component implemented by processor 104 or stored in computer-readable storage medium 106, or a combination thereof.

Figure 8:
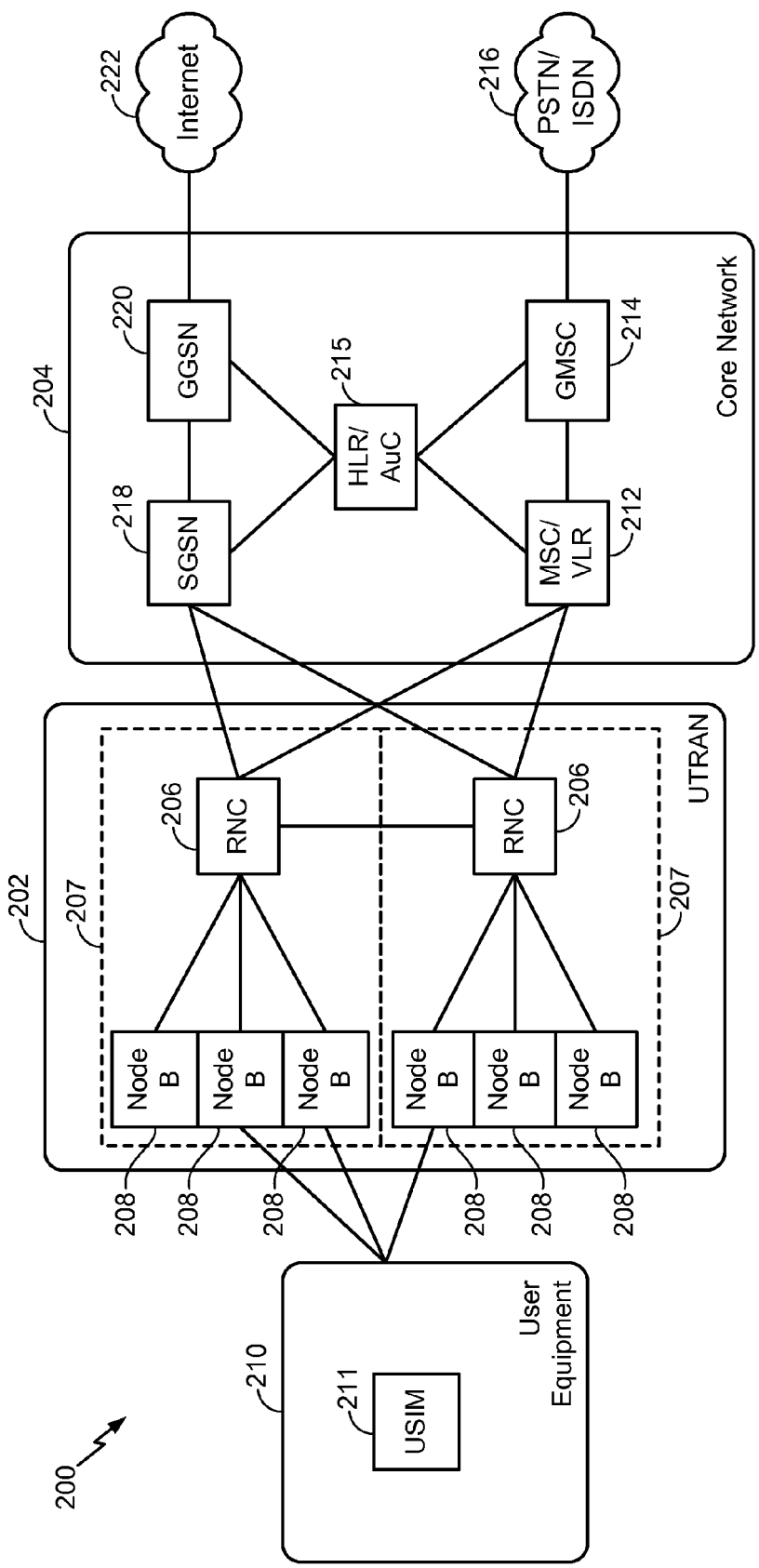
FIG. 8 is a block diagram conceptually illustrating an example of a telecommunications system including a UE or Node B configured to perform the functions described herein.

Referring to FIG. 8, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. Node B 208 and/or UE 210, which respectively may include serving wireless node 12 and UE 14 of FIGS. 1 and 2, may be configured to include, for example, call processing component 30 and 40 for prioritizing RRC messages, as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the channel quality indicator (CQI) and protocol control information (PCI).

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
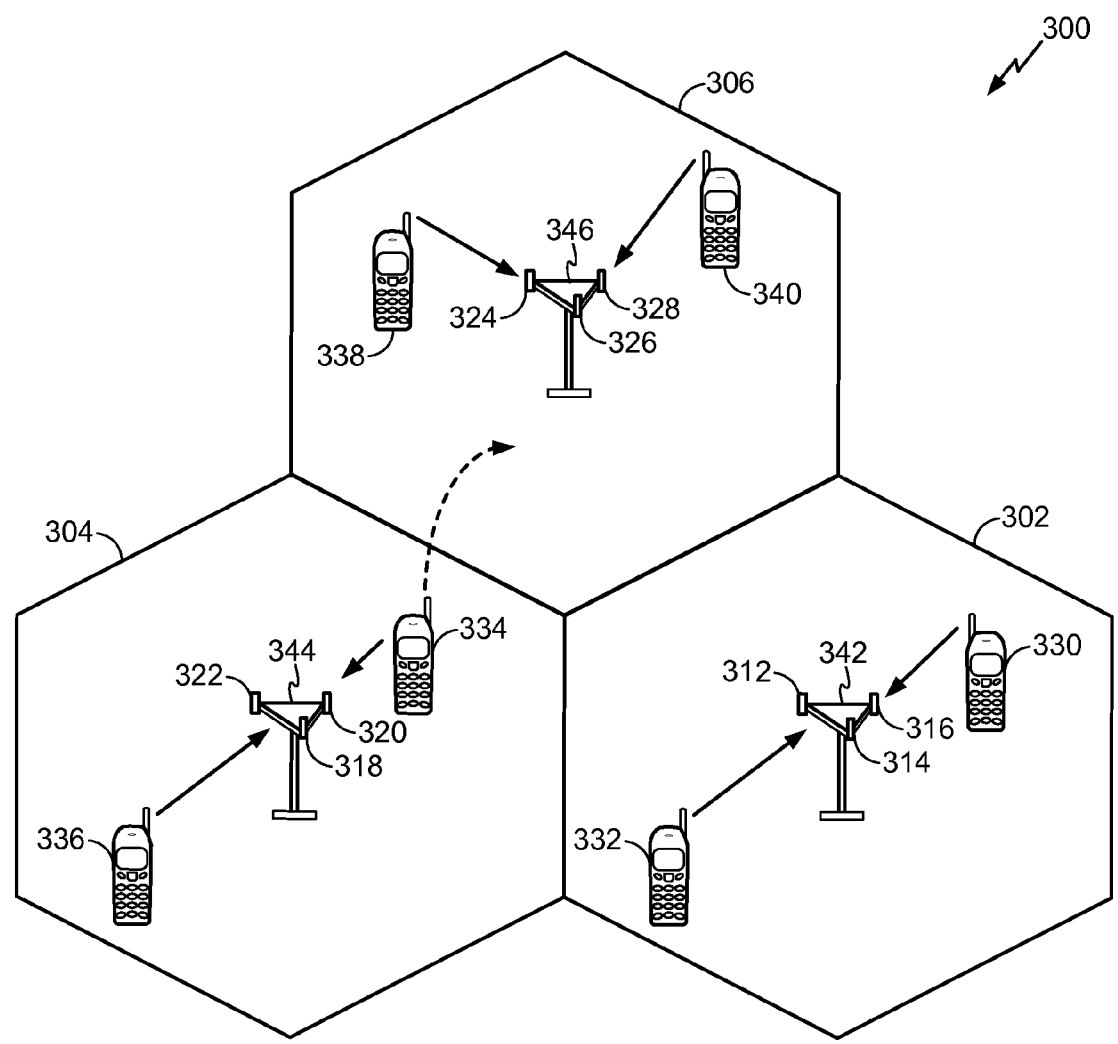
FIG. 9 is a conceptual diagram illustrating an example of an access network including a UE or Node B configured to perform the functions described herein.

Referring to FIG. 9, an access network 300 in a UTRAN architecture is illustrated, including one or more Node Bs and/or one or more UEs respectively having call processing component 30 or 40 for prioritizing RRC messages, as described herein. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 10) for all the UEs 330, 332, 334, 336, 338, 340 in the respective cells 302, 304, and 306. Node Bs 342, 344, 346 and UEs 330, 332, 334, 336, 338, 340, which respectively may include serving wireless node 12 and UE 14 of FIGS. 1 and 2, may be configured to include, for example, call processing component 30 and 40 (FIGS. 1 and 2) as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 8), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; LTE and LTE Advanced. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
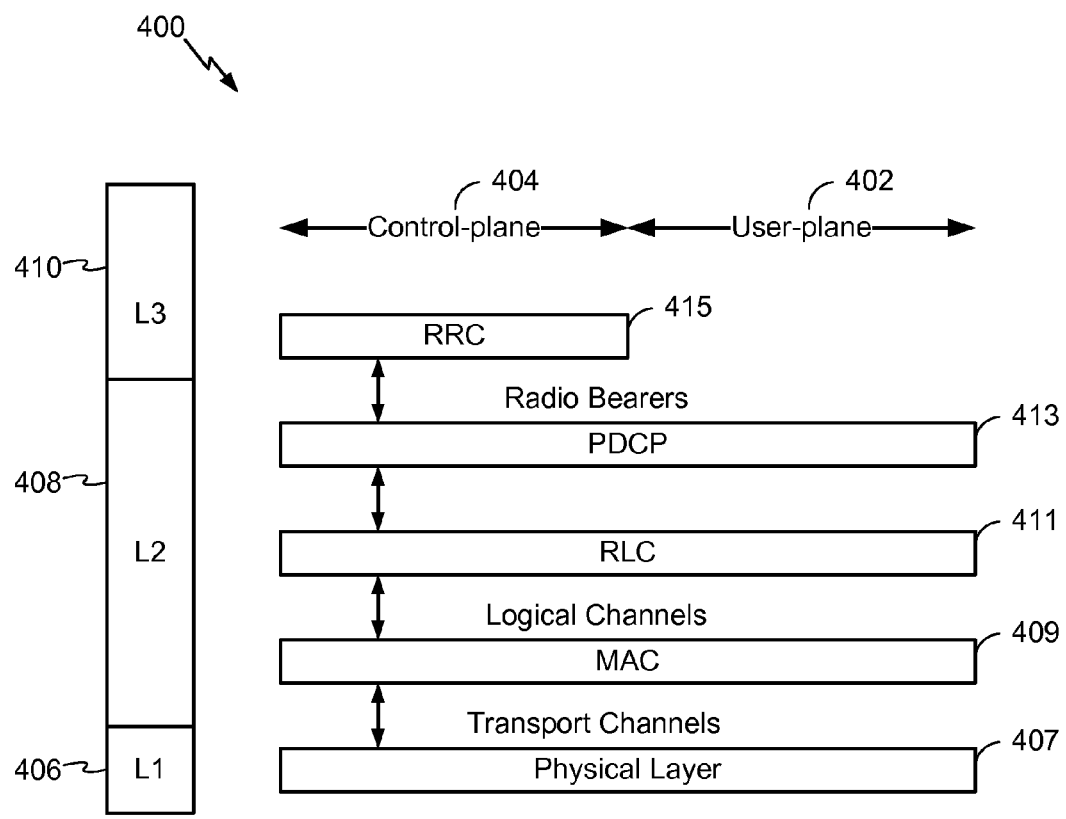
FIG. 10 is a conceptual diagram illustrating an example of a radio protocol architecture for the user and control planes for a Node B and/or a UE configured to perform the functions described herein.

FIG. 10 is a conceptual diagram illustrating an example of the radio protocol architecture 400 for the user plane 402 and the control plane 404 of a user equipment (UE) or node B/base station. For example, architecture 400 may be included in a network entity and/or UE such as serving wireless node 12 and/or UE 14 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 11:
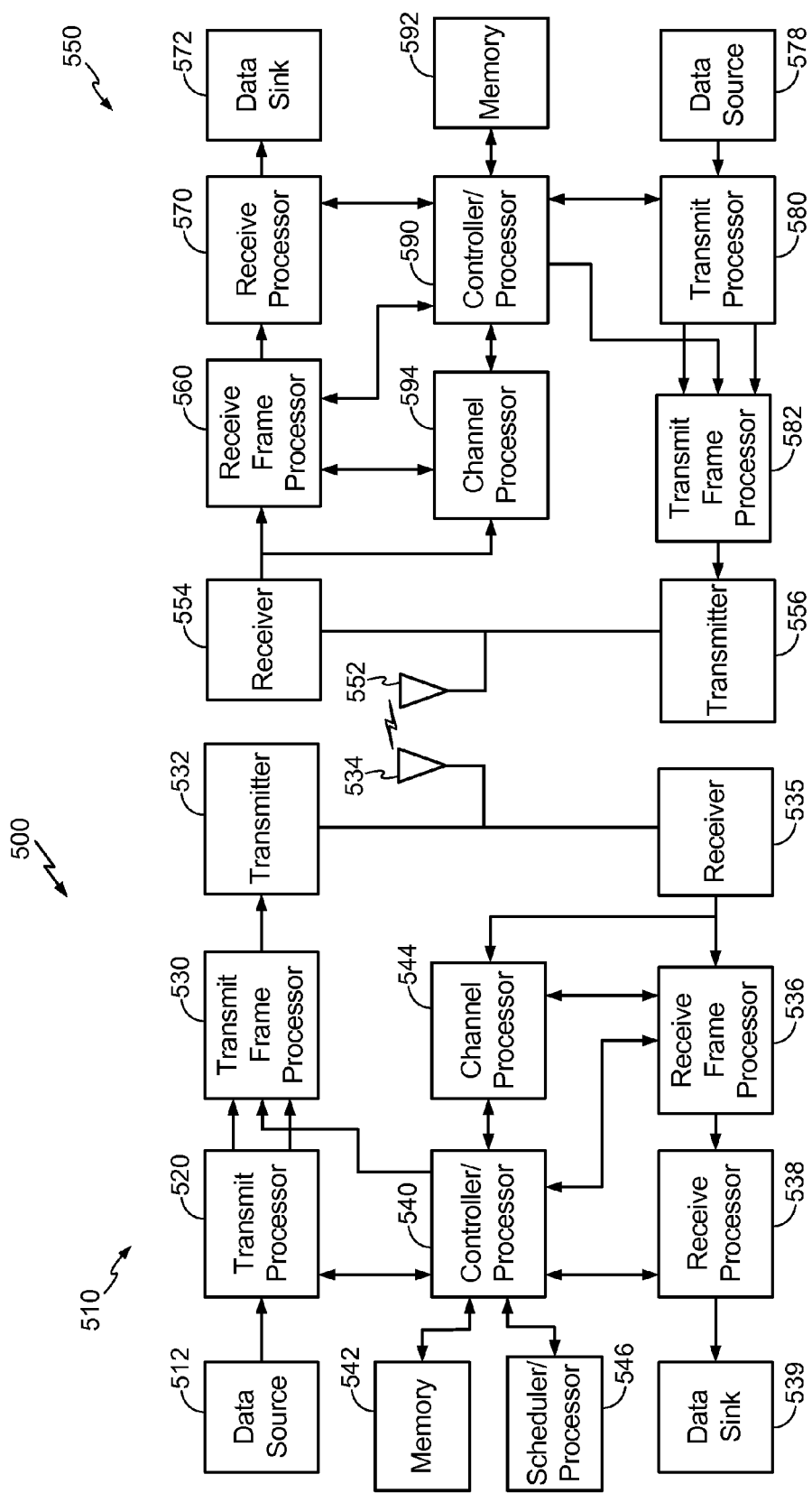
FIG. 11 is a block diagram conceptually illustrating an example of a Node B in communication with a UE in a telecommunications system, wherein the Node B and/or a UE may be configured to perform the functions described herein.

FIG. 11 is a block diagram of a communication system 500 including a Node B 510 in communication with a UE 550, where Node B 510 may be an entity such as serving wireless node 12 and the UE 550 may be UE 14 according to the aspects described in FIGS. 1 and 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors, such as processor 352 (FIG. 5), processor 104 (FIG. 7), and/or processors 540 and 590 (FIG. 11). Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium, such as computer readable medium 106 (FIG. 7). The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communicating in a communication network, comprising:
    receiving one or more radio resource control (RRC) messages in a radio link control (RLC) queue;
    determining an RRC message type for each of the one or more RRC messages located in the RLC queue;
    prioritizing, by a processor, each of the one or more RRC messages located in the RLC queue according to a prioritization schedule, wherein the prioritization schedule corresponds to a relative order for transmitting each of the one or more RRC messages based on the corresponding RRC message type; and
    transmitting each of the prioritized one or more RRC messages in response to prioritizing each of the one or more RRC messages.

2. The method of claim 1, further comprising:
    analyzing each of the one or more RRC messages in the RLC queue such that the associated RRC message type is utilized in the prioritizing to at least partially order the one or more RRC messages.

3. The method of claim 1, wherein each of the one or more RRC messages are prioritized such that signaling types of RRC messages are prioritized over other types of RRC messages.

4. The method of claim 3, wherein each of the one or more RRC messages are prioritized to achieve a signaling time frame set by a messaging standard within which each of the prioritized one or more RRC messages are transmitted.

5. The method of claim 1, wherein the one or more RRC messages include signaling messages and measurement messages.

6. The method of claim 1, wherein the one or more RRC messages comprise a first RRC message type including a signaling message, a second RRC message type including a measurement message, and a third RRC message type including a message different from the signaling message and the measurement message, and wherein prioritizing according to the prioritization schedule comprises ordering the first RRC message type before the second RRC message type and the third RRC message type, and ordering the second RRC message type before the third RRC message type.

7. The method of claim 6, wherein the one or more RRC messages are received in a first-in-first-out (FIFO) order, and wherein any of the one or more RRC messages of the third RRC message type remain in the FIFO order, relative to one another, after the prioritizing.

8. The method of claim 1, wherein the one or more RRC messages are received in a first-in-first-out (FIFO) order, and wherein an order of each of the prioritized one or more of RRC messages is different from the FIFO order of each of the one or more RRC messages based on a prioritization schedule that prioritizes signaling types of RRC messages over other types of RRC messages.

9. The method of claim 1, wherein transmitting each of the prioritized one or more of RRC messages further comprises transmitting in a descending order of priority.

10. The method of claim 1, wherein transmitting each of the prioritized one or more of RRC messages further comprises transmitting on an uplink.

11. The method of claim 1, wherein transmitting each of the prioritized one or more of RRC messages further comprises transmitting on a downlink.

12. A computer program product for communicating in a communication network, comprising:
a computer-readable medium, including:
at least one instruction operable to cause a computer to receive one or more radio resource control (RRC) messages in a radio link control (RLC) queue;
at least one instruction operable to cause the computer to determine an RRC message type for each of the one or more RRC messages located in the RLC queue;
at least one instruction operable to cause the computer to prioritize each of the one or more RRC messages located in the RLC queue according to a prioritization schedule, wherein the prioritization schedule corresponds to a relative order for transmitting each of the one or more RRC messages based on the corresponding RRC message type; and
at least one instruction operable to cause the computer to transmit each of the prioritized one or more RRC messages in response to prioritizing each of the one or more RRC messages.

13. The computer program product of claim 12, wherein the at least one instruction operable to cause the computer to prioritize each of the one or more RRC messages such that signaling types of RRC messages are prioritized over other types of RRC messages.

14. The computer program product of claim 12, wherein the one or more RRC messages comprise a first RRC message type including a signaling message, a second RRC message type including a measurement message, and a third RRC message type including a message different from the signaling message and the measurement message, and wherein the at least one instruction operable to cause the computer to prioritize further comprises prioritizing according to the prioritization schedule that orders the first RRC message type before the second RRC message type and the third RRC message type, and that orders the second RRC message type before the third RRC message type.

15. The computer program product of claim 14, wherein the one or more RRC messages are received in a first-in-first-out (FIFO) order, and wherein any of the one or more RRC messages of the third RRC message type remain in the FIFO order, relative to one another, after the prioritizing.

16. The computer program product of claim 12, wherein the at least one instruction operable to cause the computer to transmit further comprises transmitting each of the prioritized one or more of RRC messages on an uplink or on a downlink.

17. An apparatus for wireless communication, comprising:
means for receiving one or more radio resource control (RRC) messages in a radio link control (RLC) queue;
means for determining an RRC message type for each of the one or more RRC messages located in the RLC queue;
means for prioritizing each of the one or more RRC messages located in the RLC queue according to a prioritization schedule, wherein the prioritization schedule corresponds to a relative order for transmitting each of the one or more RRC messages based on the corresponding RRC message type; and
means for transmitting each of the prioritized one or more RRC messages in response to prioritizing each of the one or more RRC messages.

18. The apparatus of claim 17, wherein the means for prioritizing prioritizes each of the one or more RRC messages such that signaling types of RRC messages are prioritized over other types of RRC messages.

19. The apparatus of claim 17, wherein the one or more RRC messages comprise a first RRC message type including a signaling message, a second RRC message type including a measurement message, and a third RRC message type including a message different from the signaling message and the measurement message, and wherein the means for prioritizing further comprises means for prioritizing according to the prioritization schedule that orders the first RRC message type before the second RRC message type and the third RRC message type, and that orders the second RRC message type before the third RRC message type.

20. The apparatus of claim 19, wherein the one or more RRC messages are received in a first-in-first-out (FIFO) order, and wherein any of the one or more RRC messages of the third RRC message type remain in the FIFO order, relative to one another, after the prioritizing.

21. The apparatus of claim 17, wherein the means for transmitting further comprises transmitting the each of prioritized one or more of RRC messages on an uplink or on a downlink.

22. An apparatus for communicating in a communication network, comprising:
a communications component comprising a receiver configured to receive one or more radio resource control (RRC) messages in a radio link control (RLC) queue;
a message type detector component configured to determine an RRC message type for each of the one or more RRC messages located in the RLC queue;
a prioritization module, comprising a processor, configured to prioritize each of the one or more RRC messages located in the RLC queue according to a prioritization schedule, wherein the prioritization schedule corresponds to a relative order for transmitting each of the one or more RRC messages based on the corresponding RRC message type; and
wherein the communications component further comprises a transmitter configured to transmit each of the prioritized one or more RRC messages in response to prioritizing each of the one or more RRC messages.

23. The apparatus of claim 22, further comprising:
analyzing each of the one or more RRC messages in the RLC queue such that the associated RRC message type is utilized in the prioritizing to at least partially order the one or more RRC messages.

24. The apparatus of claim 22, wherein each of the one or more RRC messages are prioritized such that signaling types of RRC messages are prioritized over other types of RRC messages.

25. The apparatus of claim 24, wherein each of the one or more RRC messages are prioritized to achieve a signaling time frame set by a messaging standard within which each of the prioritized one or more RRC messages are transmitted.

26. The apparatus of claim 22, wherein the one or more RRC messages include signaling messages and measurement messages.

27. The apparatus of claim 22, wherein the one or more RRC messages comprise a first RRC message type including a signaling message, a second RRC message type including a measurement message, and a third RRC message type including a message different from the signaling message and the measurement message, and wherein prioritizing according to the prioritization schedule comprises ordering the first RRC message type before the second RRC message type and the third RRC message type, and ordering the second RRC message type before the third RRC message type.

28. The apparatus of claim 27, wherein the one or more RRC messages are received in a first-in-first-out (FIFO) order, and wherein any of the one or more RRC messages of the third RRC message type remain in the FIFO order, relative to one another, after the prioritizing.

29. The apparatus of claim 22, wherein the one or more RRC messages are received in a first-in-first-out (FIFO) order, and wherein an order of each of the prioritized one or more of RRC messages is different from the FIFO order of each of the one or more RRC messages based on a prioritization schedule that prioritizes signaling types of RRC messages over other types of RRC messages.

30. The apparatus of claim 22, wherein transmitting each of the prioritized one or more of RRC messages further comprises transmitting in a descending order of priority.

31. The apparatus of claim 22, wherein transmitting each of the prioritized one or more of RRC messages further comprises transmitting on an uplink.

32. The apparatus of claim 22, wherein transmitting each of the prioritized one or more of RRC messages further comprises transmitting on a downlink.

* * * * *